(12) United States Patent
Popa et al.

(10) Patent No.: US 11,936,157 B2
(45) Date of Patent: Mar. 19, 2024

(54) LASER DEVICE

(71) Applicants: Cambridge Enterprise Limited, Cambridge (GB); Politecnico Di Milano, Milan (IT); Fondazione Istituto Italiano Di Tecnologia, Genoa (IT)

(72) Inventors: Daniel Popa, Cambridge (GB); Giulio Cerullo, Milan (IT); Tullio Scopigno, Genoa (IT); Dario Polli, Milan (IT); Andrea Ferrari, Cambridge (GB)

(73) Assignees: CAMBRIDGE ENTERPRISE LIMITED, Cambridge (GB); POLITECNICO DI MILANO, Milan (IT); FONDAZIONE INSTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 16/612,613

(22) PCT Filed: May 11, 2018

(86) PCT No.: PCT/GB2018/051283
§ 371 (c)(1),
(2) Date: Nov. 11, 2019

(87) PCT Pub. No.: WO2018/206980
PCT Pub. Date: Nov. 15, 2018

(65) Prior Publication Data
US 2020/0203911 A1    Jun. 25, 2020

(30) Foreign Application Priority Data
May 12, 2017 (IT) .................. 102017000051935

(51) Int. Cl.
*H01S 3/067* (2006.01)
*G01N 21/65* (2006.01)
(Continued)

(52) U.S. Cl.
CPC ......... *H01S 3/06791* (2013.01); *G01N 21/65* (2013.01); *H01S 3/082* (2013.01);
(Continued)

(58) Field of Classification Search
CPC .. H01S 3/06791; H01S 3/2391; H01S 3/1115; H01S 3/1118
See application file for complete search history.

(56) References Cited

U.S. PATENT DOCUMENTS 6,807,342 B2    10/2004   Fan
7,372,880 B2     5/2008   Jablonski et al.
(Continued)

FOREIGN PATENT DOCUMENTS

CN    1723594      1/2006
CN    102623874    8/2012
(Continued)

OTHER PUBLICATIONS

Jia et al. ("Passively synchronized q-switched and mode-locked dual-band tm3+:ZBLAN fiber lasers using a common graphene saturable absorber", Scientific Reports, 6:36071, Nov. 2, 2016) (Year: 2016).*
(Continued)

*Primary Examiner* — Tod T Van Roy
(74) *Attorney, Agent, or Firm* — Hamre, Schumann, Mueller & Larson, P.C.

(57) ABSTRACT

A laser device comprises a first optical cavity comprising a first gain medium and a second optical cavity comprising a second gain medium. The first gain medium and the second gain medium generate light at respective different ranges of
(Continued)

wavelengths. A synchronizer is optically coupled to both the first optical cavity and the second optical cavity and is configured to synchronize and mode-lock light from the first optical cavity and the second optical cavity. The laser device also includes a first optical filter and a second optical filter to filter the light from the first optical cavity and the second optical cavity respectively to output first filtered light pulses at a first predetermined range of wavelengths and second filtered light pulses at a second predetermined range of wavelengths.

15 Claims, 5 Drawing Sheets

(51) Int. Cl.
    *H01S 3/082*    (2006.01)
    *H01S 3/105*    (2006.01)
    *H01S 3/1118*   (2023.01)
    *H01S 3/16*     (2006.01)
    *H01S 3/23*     (2006.01)

(52) U.S. Cl.
    CPC ............ *H01S 3/105* (2013.01); *H01S 3/1118* (2013.01); *H01S 3/1608* (2013.01); *H01S 3/1618* (2013.01); *H01S 3/2391* (2013.01); *G01N 2021/653* (2013.01)

(56) References Cited

U.S. PATENT DOCUMENTS

| | | | |
|---|---|---|---|
| 7,602,825 B1 | 10/2009 | Lin et al. | |
| 2011/0280263 A1 | 11/2011 | Kieu et al. | |
| 2016/0178439 A1* | 6/2016 | Freudiger | G01N 15/1434 356/301 |
| 2019/0221986 A1* | 7/2019 | Guo | H01S 3/108 |

FOREIGN PATENT DOCUMENTS

| | | | |
|---|---|---|---|
| CN | 103502884 | | 1/2014 |
| CN | 103843210 | | 6/2014 |
| CN | 105826801 | | 8/2016 |
| CN | 209200364 | * | 8/2019 |
| CN | 111404007 | * | 7/2020 |
| JP | 2008-177484 | | 7/2008 |
| JP | 2010-026027 | | 2/2010 |
| JP | 2010-093246 | | 4/2010 |
| JP | 2015-158482 | | 9/2015 |
| JP | 2017-1089017 A | * | 6/2017 |
| WO | 2004/054050 | | 6/2004 |

OTHER PUBLICATIONS

CN105826801A Espacenet translation (Year: 2021).*
Ekspla laser product page (https://ekspla.com/products/picosecond-lasers/; captured Dec. 2017) (Year: 2017).*
International Search Report and Written Opinion, issued in the corresponding PCT Application No. PCT/GB2018/051283 , dated Jul. 26, 2018, 18 pages.
Zhang et al., "Passive synchronization of all-fiber lasers through a common saturable absorber", Optics Letters, vol. 36, No. 20, Optical Society of America, Oct. 15, 2011, 4 pages.
Sotor et al., "Passive synchronization of erbium and thulium doped fiber mode-locked lasers enhanced by common graphene saturable absorber", Optics Express, vol. 22, No. 5, Mar. 10, 2014, 8 pages.
Zhang et al., "Ultrafast fibre laser sources: Example of recent developments", Optical Fiber Technology, vol. 20, No. 6, Dec. 2014, 12 pages.
Su et al., "Single-fiber-laser-based wavelength tunable excitation for coherent Raman spectroscopy", Optical Society of America, vol. 30, No. 6, 2013, 12 pages.
Office Action issued for corresponding Chinese Patent Application No. 201880046105.7, dated Jan. 5, 2021, 19 pages Including English translation.
Office Action issued for Chinese Patent Application No. 201880046105.7, dated Jan. 6, 2022, 8 pages.
Office Action issued for Japanese Patent Application No. 2019-561780, dated Mar. 8, 2022, 14 pages including English translation.
Alessio Gambetta et al., "Fiber-format stimulated-Raman-scattering microscopy from a single laser oscillator," Optics Letters, vol. 35, No. 2, Jan. 15, 2010, pp. 226-228.
Christian W. Freudiger et al., "Label-Free Biomedical Imaging with High Sensitivity by Stimulated Raman Scattering Microscopy," Science, vol. 322, Dec. 19, 2008, pp. 1857-1861; DOI: 10.1126/science.1165758.
Brian G. Saar et al., "Video-Rate Molecular Imaging in Vivo with Stimulated Raman Scattering," Science, vol. 330, Dec. 3, 2010, pp. 1368-1370; DOI: 10.1126/science.1197236.
"RP Photonics Encyclopedia, Picosecond Lasers," available at: https://www.rp-photonics.com/picosecond_lasers.html; accessed on Sep. 20, 2022.

* cited by examiner

LASER DEVICE

FIELD OF INVENTION

The present invention relates to a laser device and, in particular, a laser device for use with coherent Raman spectroscopy.

BACKGROUND

Raman spectroscopy enables label-free chemical signatures of tissues and cells. It is based on the Raman scattering effect of molecules with the use of a single continuous wave laser. Such spontaneous Raman scattering is weak, and therefore Raman spectroscopy is typically slow. Coherent Raman spectroscopy (CRS), including coherent anti-Stokes Raman scattering (CARS), and stimulated Raman scattering (SRS) relies on nonlinear excitation of molecules, and can enhance the Raman intensity by orders of magnitude. In theory, such increase in Raman intensity allows measurement to be made at video-rate imaging speeds, which, in theory, means that CRS could be used in many applications in many different fields.

CRS requires the use of synchronised ultra-fast at least pico-second lasers from two laser sources, where pump and Stokes pulses matching the Raman frequency and bandwidths are used for setting up and detecting a vibrational coherence within a sample. Currently, solid-state lasers pumping optical parametric oscillators have been widely used as the laser source for CRS, as these laser sources allow access to the full Raman spectrum (0-4000 $cm^{-1}$). Such solid-state laser devices comprise a bulk piece of doped crystal or glass as the gain medium and require the use of bulky optics. They are, therefore, not only susceptible to misalignment and prone to instability, but their use also incurs a high capital cost. Furthermore, their relatively large footprints prevent them from being deployed effectively in clinical environments, for example, they cannot be easily moved around different wards in a hospital, nor they can be handled conveniently.

The use of fiber-format lasers has gained popularity in recent years because such laser devices offer a simpler, more cost effective excitation source with a smaller footprint. They are also more reliable and do not require alignment, in comparison with the solid-state lasers pumping optical parametric oscillators.

U.S. Pat. No. 7,372,880 discloses a pulsed fibre laser that is capable of generating ultrashort light pulses. The pulsed fibre laser comprises an optical ring resonator having a length of rare-earth doped fiber as a gain medium. In use, the gain medium responds to a pumped light source to produce optical gain in the resonator. To facilitate pulse generation, carbon nanotubes (CNT) are employed as a non-linear optical or saturable absorber material to convert continuous wave laser into ultrafast optical pulse trains. A saturable absorber is an optical component with a certain optical loss, which is reduced at high optical intensities. Each time a pulse hits a saturable absorber as it circulates the optical ring resonator, it saturates the saturable absorber's absorption, thus temporarily reducing the losses. In each resonator round trip, the saturable absorber will then favor the light which has somewhat higher intensities, because this light can saturate the absorption slightly more than light with lower intensities. After many round trips, a single pulse will remain.

There are recent studies in the field directed towards the synchronization of dual-wavelength ultrafast laser sources with a passive mode-locking technique, in order to produce synchronized light pulses from two different laser sources. This technique requires the use of a common saturable absorber shared by the two laser sources, for example optically coupling the common saturable absorber to two fiber cavities doped with different rare-earth materials.

Zhang et al., "Passive synchronization of all-fiber lasers through a common saturable absorber", Optics Letter, (2011) (Zhang) discloses the synchronization of two all-fiber mode-locked lasers, operating at 1 μm and 1.54 μm, coupled through the use of a shared single-wall carbon nanotube absorber. Furthermore, Zhang et al., "Ultrafast fibre laser sources: Example of recent developments", Optical Fiber Technology, (2014) summarizes the recent developments in the field of ultrafast compact all-fiber lasers. More specifically, Zhang discloses the use of graphene and single-wall carbon nanotubes as passive elements to carry out synchronization and passive mode-locking of laser pulses in two coupled optical cavities. The optical cavities comprise an ytterbium or erbium doped fiber gain medium for generating dual-wavelength light pulses for pump probe spectroscopy.

Sotor et al., "Passive synchronization of erbium and thulium doped fiber mode-locked lasers enhanced by common graphene saturable absorber", Optics Express (2014) (Sotor) discloses the use of a common graphene saturable absorber for synchronizing light pulses from two loop resonators, each comprises one of erbium and thulium doped fiber gain medium. In Sotor, a 1569 nm laser diode is used for exciting the thulium gain medium, in order to generate light pulses at 2 μm. A wavelength division multiplexer (WDM) filter is provided to filter out any unabsorbed pump light at the wavelength of 1569 nm, wherein said unabsorbed pump light is purged to the erbium loop resonator to be output with the 1.5 μm light pulses.

SUMMARY OF INVENTION

The use of a fiber laser and, in particular, an all-fiber laser leads to the miniaturization of laser sources for CRS, and thus enables a mobile or readily portable measurement system.

Such a laser also requires no alignment. Significantly, this extends its potential use to different fields. However the synchronized, mode-locked dual laser pulses generated in fiber lasers are typically spread over a wide range of wavelengths, or in the case of Sotor the laser pulses include unabsorbed pump light that peaks at undesirable wavelength. As a result its use in CRS significantly reduces measurement accuracy.

Su et al., "Single-fiber-laser-based wavelength tunable excitation for coherent Raman spectroscopy", J. Opt. Soc. Am. B (2013) (Su) discloses a single-laser light source for coherent Raman spectroscopy. In Su, the frequency difference between the pump and the Stokes pulses was generated by soliton self-frequency shifting in a nonlinear optical fiber (a soliton is a wave packet that maintains its shape while propagating at constant velocity). It is disclosed that one other possible way to increase CRS spectral resolution is to apply narrowband optical filters on both the pump and the Stokes beams. However, it is also disclosed that this would significantly reduce the optical power for both the pump and the Stokes beams and therefore, chirping (where frequency of a signal changes with time) is considered as a better choice than optical filtering.

The present applicant has mitigated the above problem of improving accuracy of measurement of CRS by providing a laser device for outputting filtered light pulses for inducing coherent Raman scattering in a sample, in which the laser device comprises: a first optical cavity comprising a first gain medium; and a second optical cavity comprising a second gain medium different to the first gain medium. The first gain medium and the second gain medium are each excitable by a pump light source to generate light at respective different ranges of wavelengths. In other words, two optical cavities are provided. The laser device also includes a synchronizer optically coupled to both the first optical cavity and the second optical cavity, wherein the synchronizer is configured to synchronize and mode-lock light from the first optical cavity and the second optical cavity; and a first optical filter and a second optical filter, wherein the first optical filter and the second optical filter are configured to filter the light from the first optical cavity and the second optical cavity respectively in order to output first filtered light pulses at a first predetermined range of wavelengths and second filtered light pulses at a second predetermined range of wavelengths.

In this way, significantly, a laser device is provided that enables CRS at fast enough speeds for non-invasive imaging. That is to say, to obtain objective and quantitative information of a tissue, by measuring its detailed molecular composition through its vibrational response detected by CRS. Examples of the laser device also provide a convenient tool for pump-probe experiments, and provide a suitable pump source for parametric mixing and frequency up/down conversion.

Broadly, in the laser device described, each optical cavity of the laser device comprises a gain element, and isotropic, single-mode fibers. The optical cavity lengths are matched using a fiber-pigtailed optical delay line inserted in one half. A saturable absorber is used: to initiate and promote strong intra-cavity pulsing through intensity dependent loss, and mediate synchronism through an absorptive nonlinear coupling, i.e. a pulse (probe) sees a loss reduction caused by a higher energy pulse (pump). The frequency tuning is enabled by a tunable filter stage located either within the optical cavities or at their outputs. Following the synchronized oscillators, fiber amplifiers increase the average power of the two branches to hundreds of mW level required for the application. In other words, two independent laser media are synchronously mode-locked to provide a multi-color sequence of pulses for CRS. Passive synchronization is achieved by the shared used of a nanomaterial saturable absorber. Frequency detuning is achieved by a tunable filter stage located either within or outside the cavities.

Specifically, in the examples described, the laser device uses nanomaterial-synchronized ultrafast fiber lasers for CRS. Two independent mode-locked fiber lasers are locked in synchronism (i.e. pulses have the same repetition rate) through the shared interaction of a saturable absorber or synchronizer based on a nanomaterial, including, for example, graphene, carbon allotropes, layered crystals and hybrid nanomaterials.

In contrast to the known implementation of CRS, where one of the two required independent picosecond pulses of different frequencies is generated through parametric amplification, in the laser device described herein, different laser media emitting at different frequencies are passively synchronized, by using a nanomaterial, thus greatly simplifying the generation of multi-color (multi-frequency) pulse sequences required for CRS.

In the examples described, two independent mode-locked oscillators or optical cavities are provided that are synchronized through the shared interaction of a saturable absorber in the form of a graphene-based polymer-composite saturable absorber (GSA) in a common cavity segment. The GSA is prepared by exfoliating bulk graphite by mild ultrasonication. A dispersion enriched with single layer and few layer graphene is then mixed with an aqueous solution of polyvinyl alcohol, resulting in a polymer-composite. Each oscillator comprises a gain element, Yb and Eb, an optical isolator, and a tunable bandpass filter. Fused fiber couplers independently provide 30% output for each cavity. The optical cavity lengths are matched using a fiber-pigtailed optical delay line inserted into the Er half, arm or loop of the laser device, corresponding to a ~18 MHz pulse repetition rate in a synchronous state.

In the examples described, the GSA is used both to initiate and promote mode-locked operation and to mediate synchronism, exploiting the unique ultra-broadband nonlinear response of graphene. The dual output of the synchronous, two-color laser, at Yb (pump) and Er (Stokes) wavelengths, is independently amplified to 100 mW average power in Yb- and Er-doped fiber amplifiers. The two beams are then collimated, synchronized and combined using a dichroic mirror arrangement, before being focused into a methanol test sample and bandpass filtered for CARS detection. Tuning the optical distance of the intra-cavity delay line, the lasing characteristics switch to passively synchronized mode-locking.

The laser operating wavelengths may be tuned by the intracavity tunable filters for each arm or loop of the laser device in the 1040-1080 nm (Yb) and 1535-1560 nm (Er) ranges (corresponding to −2750-3200 $cm^{-1}$ frequency detuning).

The laser device described herein passively synchronizes fiber lasers, providing a very simple and low cost laser source for CRS. Fiber lasers enable robust and stable sources, owing to their simple, compact, and cost-effective designs, and an alignment-free operation that does not require bulky optical setups.

As explained below, examples of the laser device described herein, have been applied to CARS, thus proving the concept. Due to their compactness and all-optical synchronization, the examples described are a good source for CRS in the high-wavenumber region.

The invention in its various aspects is defined in the independent claims below to which reference should now be made. Optional features are set forth in the dependent claims.

Arrangements are described in more detail below and take the form of a laser device for outputting filtered light pulses for inducing coherent Raman scattering in a sample. The laser device comprises a first optical cavity comprising a first gain medium; and a second optical cavity comprising a second gain medium different to the first gain medium. The first gain medium and the second gain medium are each excitable by a pump light source to generate light at respective different ranges of wavelengths. A synchronizer is optically coupled to both the first optical cavity and the second optical cavity. The synchronizer is configured to synchronize and mode-lock light from the first optical cavity and the second optical cavity. The laser device also includes a first optical filter and a second optical filter. The first optical filter and the second optical filter are configured to filter the light from the first optical cavity and the second optical cavity respectively in order to output first filtered light pulses at a first predetermined range of wavelengths and second filtered light pulses at a second predetermined range of wavelengths.

Optionally, the laser device is a fiber laser. Optionally, the laser device is an all-fiber laser. Optionally, the first optical cavity and second optical cavity comprises an isotropic optical fiber. Optionally, each of the first optical cavity and second optical cavity comprises a single-mode optical fiber.

The synchronizer permits the synchronization and phase-locking of ultrafast laser pulses, which permits the combination of two laser pulses from the fiber laser sources, leading to a reduction in the total footprint required for coherent Raman spectroscopy. The light pulses are filtered such that only light pulses within a defined range of wavelengths are output to coherent Raman spectroscopy, which yields a more accurate measurement. Furthermore, the use of two synchronized and mode-locked laser sources greatly reduces the impact of optical filters on the optical power of pump and Stokes pulses, making it a versatile choice for CRS.

In another embodiment, there is provided a laser device for outputting filtered light pulses for inducing coherent Raman scattering in a sample, the laser device comprising: a first optical cavity comprising a first gain medium; and a second optical cavity comprising a second gain medium different to the first gain medium, wherein the first gain medium and the second gain medium are each excitable by a pump light source to generate light at respective different ranges of wavelengths; a synchronizer optically coupled to both the first optical cavity and the second optical cavity, wherein the synchronizer is configured to synchronize and mode-lock light from the first optical cavity and the second optical cavity; and a first optical filter and a second optical filter, wherein the first optical filter and the second optical filter are configured to filter the light from the first optical cavity and the second optical cavity respectively in order to output first filtered light pulses at a first predetermined range of wavelengths and second filtered light pulses at a second predetermined range of wavelengths.

Optionally, at least one of the first optical filter or second optical filter is a tunable optical filter and configured to vary the first predetermined range of wavelengths or the second predetermined range of wavelengths respectively.

Optionally, both of the first optical filter or second optical filter is a tunable optical filter and configured to vary the first predetermined range of wavelengths and the second predetermined range of wavelengths respectively. Tunable optical filters allow the ranges of wavelengths to be specified by the user so that the range of wavelengths of the pump and Stokes light pulses can be varied with respect to the sample being measured.

Optionally, the tunable optical filter comprises an etalon based fiber optic tunable filter. An etalon is a dielectric material where its specific thickness and refraction index dictates the bandwidth of each transmission peak, and only one wavelength is transmitted with maximum transmission. An etalon based fiber optic tunable filter works by selecting the refraction index of the medium of the material to select a specific resonant wavelength. The wavelength in resonance with the optical length of the cavity is transmitted, whereas the other wavelengths are reflected.

Optionally, the first optical filter and the second optical filter are positioned within the first optical cavity and second optical cavity respectively, and wherein the first optical cavity and the second optical cavity respectively outputs the filtered light pulse at a first optical outlet and a second optical outlet. Having the optical filters fitted inside the optical cavities ensures light pluses with undesired ranges of wavelengths are promptly filtered after their generation.

Optionally, the first optical filter and the second optical filter are positioned externally to the first optical cavity and second optical cavity respectively, and wherein the first optical cavity and the second optical cavity respectively output the light pulses at a first optical outlet and a second optical outlet. Having the optical filters placed externally to the optical cavities eliminates the need to filter the recirculating filtered light pulses repeatedly, as well as permitting the construction of simple and compact optical cavities.

Optionally, the laser device further comprising a first fiber amplifier doped with the first gain medium at the first optical outlet and a second fiber amplifier doped with the second gain medium at the second optical outlet for amplifying the light pulses or the filtered light pulses. This ensures the amplified light pulses are amplified at the correct wavelength. The use of amplifiers mitigates the reduction in optical power when optical filters are in place.

Optionally, the synchronizer comprises graphene or carbon allotropes, for example carbon nanotubes. Optionally, the synchronizer comprises graphene, due to the fact that graphene is capable of synchronizing lasers at any wavelength in the infrared.

Optionally, the synchronizer comprises a saturable absorber and is configured to carry out synchronization and passive mode locking of the light pulses from the first optical cavity and the second optical cavity. The use of saturable absorber enables the production of synchronized ultrafast mode-locked laser pulses from different laser sources.

Optionally, one of the first optical cavity and second optical cavity comprises an optical delay line for matching the lengths of the first optical cavity and the second optical cavity. Optionally, the optical delay line comprises a fiber-pigtailed optical delay line. The use of delay line in one of the optical cavities allows the pairing of non-identical optical cavities by equalizing their lengths.

Optionally, the laser gain media comprises ytterbium or erbium, where optionally the predetermined range of wavelengths generated by said laser gain media corresponds to full Raman spectrum of 0-4000 $cm^{-1}$.

Optionally, the predetermined range of wavelengths comprises the range of 1040 nm to 1080 nm and/or 1535 nm to 1600 nm.

In another embodiment, there is provided an optical device and two collimators configured to collimate the filtered light pulses. This limits the divergence of filtered light pulses. Optionally, one of the collimators comprises a delay stage configured to achieve an overlap on the measured sample.

Optionally, the optical device further comprises two dichroic mirrors configured to combine the collimated light pulses from both of the two collimators.

Optionally, the laser device comprises a bandpass or shortpass filter for removing the pair of filtered light pulses prior to CARS detection.

In another embodiment, there is provided a method of outputting filtered light pulses from a laser device for inducing coherent Raman scattering in a sample, the method comprises generating light at respective different ranges of wavelengths with a first optical cavity comprising a first gain medium and a second optical cavity comprising a second gain medium different to the first gain medium, wherein the first gain medium and the second gain medium are each excitable by a pump light source. In other words, two optical cavities are required in outputting filtered light pulses for inducing coherent Raman scattering in a sample. The method further comprises synchronizing and mode-locking, with a synchronizer optically coupled to both the first optical cavity and the second optical cavity, the light from the first optical cavity and the second optical cavity; filtering, with a first optical filter and a second optical filter, the light from the first optical cavity and the second optical cavity respectively; and outputting from the first optical filter first filtered light pulses at a first predetermined range of wavelengths and outputting from the second optical filter second filtered light pulses at a second predetermined range of wavelengths.

BRIEF DESCRIPTION OF THE DRAWINGS

The invention will be described in more detail, by way of example, with reference to the accompanying drawings, in which.

DETAILED DESCRIPTION OF THE INVENTION

The laser device 10 and a method of outputting filtered light pulses from the laser device for inducing coherent Raman scattering in a sample 42 according to examples of the present invention are described below with reference to FIGS. 1 to 5.

Figure 1:
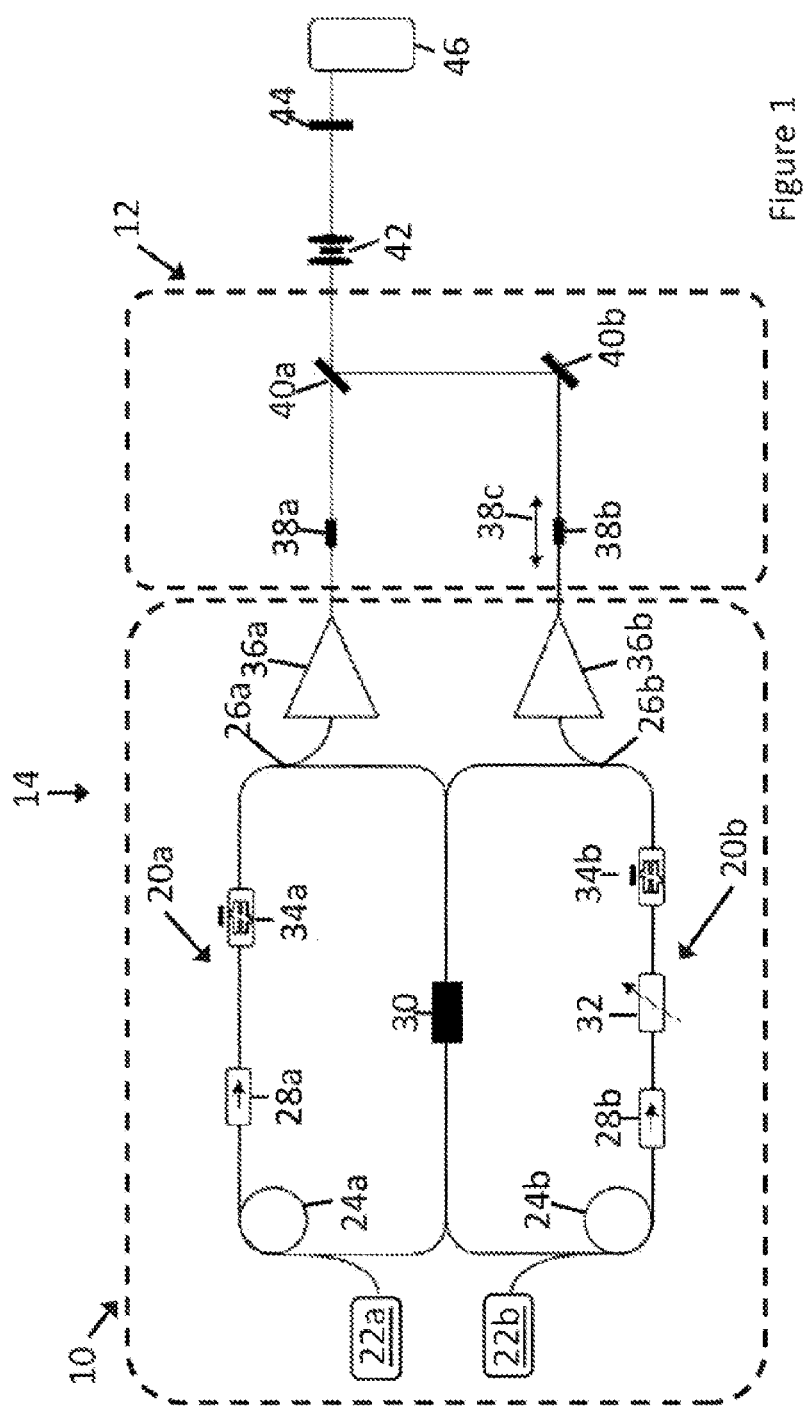
FIG. 1 is a schematic of a fiber laser setup embodying an aspect of the present invention.

Referring first to FIG. 1, broadly, the laser device 10 has two independent mode-locked optical cavities, oscillators or resonators, 20a,20b, for generating two sets of light pulses at order of pico second durations at different ranges of wavelengths suitable for CRS. As well as the laser device 10, the arrangement 14 of FIG. 1 also includes optical elements 12 that direct the light pulses from the laser device to illuminate the sample 42 on which coherent Raman scattering is being carried out. The scattering from the sample is filtered by a shortpass or bandpass filter 44 before entering a spectrometer 46.

In more detail, continuing to refer to the laser device 10 of FIG. 1, each of the two optical cavities 20a,20b of the laser device of FIG. 1 are arranged in the form of a loop. The ends of optical fibres making up the optical cavities are optically connected using any suitable couplers, in order to circulate the light pulses in the loops until their discharge from the optical cavities at their respective optical outlets 26a,26b. Furthermore, each of the optical outlets comprises fused fibre couplers to provide approximately 30% output for their respective cavities. The mode-locked optical cavities each include a pump light source 22a,22b to each of the optical cavities 20a,20b to excite gain elements 24a,24b that are located or deposited inside the optical cavities 20a, 20b. The gain elements 24a,24b, in this example, are optical fibres doped with rare earth gain elements. Laser devices using such gain elements are commonly referred to as fiber lasers.

The choice of pump light sources 22a,22b and the gain elements 24a,24b depend on the light spectra required by the CRS. The example shown in FIG. 1 uses two different optical fibers as the gain elements. One optical fiber is doped with a rare earth gain element in the form of ytterbium (Yb) 24a. The other optical fiber is doped with a rare earth gain element in the form of erbium (Er) 24b. In this example, the pump light sources to excite the gain elements are a 976 nm wavelength pump light source 22a to excite the Yb doped fiber; and a 980 nm wavelength pump light source 22b to excite the Er doped fiber. The light pulses generated from the Yb and Er gain media are in the range of desirable pump and Stokes wavelengths.

An optical isolator 28a,28b is optically coupled to the outlet of the respective gain medium 22a,22b in each of the optical cavities 20a,20b. This is in order to ensure that the light pulses generated by the gain media 22a,22b in the optical cavities travel in a single or in one and only one direction in the loops forming the optical cavities. That is, light pulses generated from the gain media 22a,22b are directed towards the optical outlets. In this example, the optical isolators 28a,28b are fiber based Faraday isolators.

The pair of light pulses generated in each of the optical cavities 20a,20b are synchronized using a suitable synchronizer 30. The synchronizer is shared by both loops forming the optical cavities 20a,20b. The synchronizer forms part of both loops. In this example, the synchronizer takes the form of a saturable absorber 30. The function of a saturable absorber is described in the background section above. A saturable absorber is a light absorber whose degree of absorption is reduced at high optical intensities. In the laser device 10, this allows passive mode-locked pulses to circulate in each of the optical cavities. More specifically, the saturable absorber functions to initiate and promote mode-locked operation and to mediate synchronisation of the light pulses. That is, passive mode-locking allows the generation of femtosecond light pulses. The saturated absorber possesses a sufficiently short recovery time so that fast loss modulation is achieved.

The saturable absorber 30 in FIG. 1 is a graphene based polymer-composite saturable absorber, which has ultrafast recovery time and broadband operation. Graphene is used as a passive element to synchronise lasers at any wavelength in the infrared, as it possesses a linear dispersion of electrons with a point bandgap at the Dirac point. The graphene saturable absorber 30 applied herein is prepared by exfoliating bulk graphite by mild ultrasonication, wherein a dispersion first enriched with obtained single layer graphene and few layer graphene is mixed with an aqueous solution of polyvinyl alcohol, resulting in a polymer composite. Other saturable absorbers may alternatively be used for carrying out passive mode locking and synchronisation of the light pulses, for example saturable absorbers comprising single-wall carbon nanotubes (CNT).

The pair of optical cavities 20a,20b do not need to be identical. The difference in cavity lengths between the two optical cavities 20a,20b is compensated for by the addition of an optical delay line 32 to either one of the optical cavities. In this example, an optical delay line 32 is located in the loop or optical cavity 20b including the optical cavity that uses Er as the gain medium after the isolator 28b. It is a fiber-pigtail delay line 32. The fiber-pigtail delay line is optically coupled to the outlet of the isolator in the optical cavity that uses Er as the gain medium. It corresponds to a repetition rate of an approximately 18 MHz pulse in a synchronized state.

Figure 2:
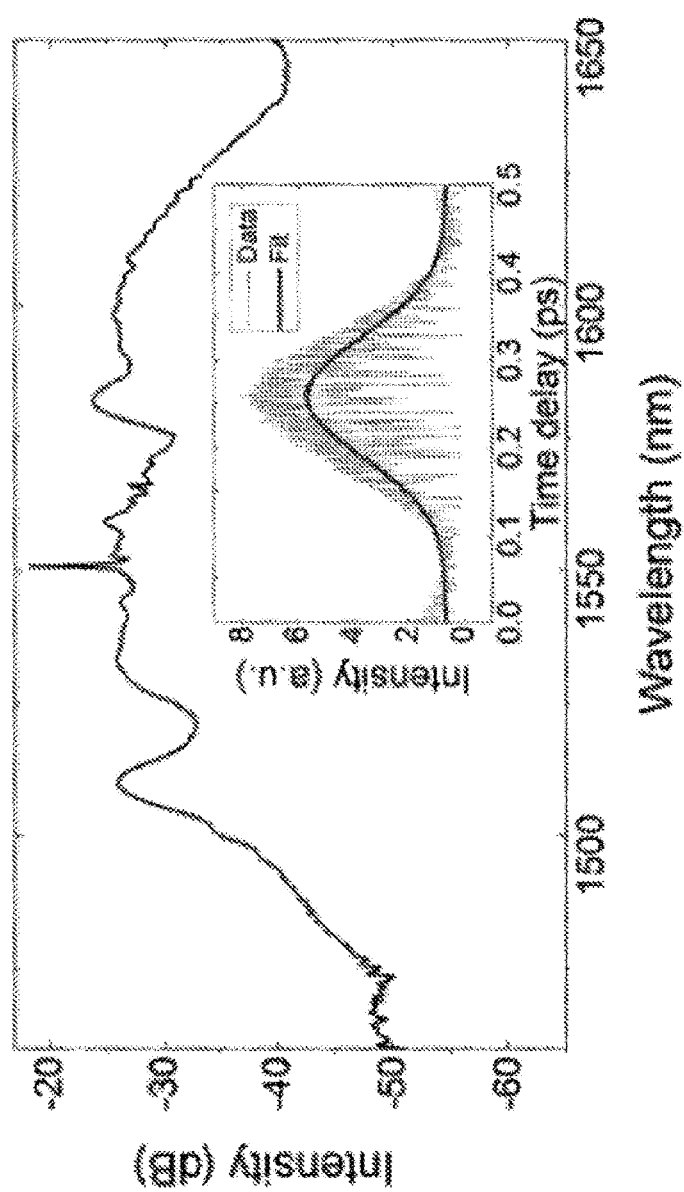
FIG. 2 is a graph showing the spectra and pulse duration of an unfiltered synchronously locked Er laser pulses output from the fibre laser setup of FIG. 1.

The ranges of wavelengths of the light pulses generated at each of the optical cavities 20a,20b are dictated by the type of gain media being excited in the respective optical cavity. For example, as shown in FIG. 2, the light pulses generated from Er spread across a relatively wide spectrum between approximately 1500 nm to 1650 nm, which are useful for broadband CARS. That is, sub-100 fs pulses may be generated.

However, light pulses with such a broad spectrum may affect the accuracy of CRS that do not cater for broadband laser pulses. Therefore, as shown in FIG. 1, an optical filter 34a,34b is installed in each of the optical cavities 20a,20b to optically filter light pulses falling outside desirable ranges of wavelengths. In this example, an optical filter is located downstream or directly after the isolator 28a in the first (Yb) optical cavity 20a and an optical filter is located downstream or directly after the optical delay line 32 in the second (Er) optical cavity 20b. In this example, the optical filters are tunable optical filters such that a desirable ranges of wavelengths can be tuned and supplied to the Raman spectroscopy. However, the optical filters 34a, 34b may be fixed or non-tunable optical filters, or passband filters, for example, Lyot filters.

Each of the optical cavities 20a,20b has an outlet 26a,26b to together output first filtered light pulses at a first predetermined range of wavelengths and second filtered light pulses at a second predetermined range of wavelengths from the laser device 10. In the example of FIG. 1, the outlets 26a,26b are located downstream of the optical filter 34a, 34b. The optical outlets are each coupled to a different fiber amplifier 36a,36b. The relevant fiber amplifier is doped with a gain element corresponding to the gain medium 24a,24b that is responsible for light pulse generation. In the example of FIG. 1, Yb- and Er-doped fibre amplifiers 36a,36b are respectively provided for optical cavities 20a,20b, in order to amplify the light pulses at the Yb (pump) and Er (Stokes) wavelengths to 100 mW average power.

The optical elements 12 of the arrangement or setup 14 illustrated in FIG. 1 includes collimators 38a,38b. The laser device 10 outputs two filtered light pulses each through a collimator. Thus, the two filtered light pluses are collimated in their respective collimators 38a,38b, in order to limit the divergence of the beams of light pulses when they are combined in a subsequent combination step by dichroic mirrors 40a and 40b described below. In some cases, where it is necessary to achieve an overlap on a sample 42, one of the two collimators may be placed on a delay stage 38c.

The optical elements 12 of the arrangement or setup 14 illustrated in FIG. 1 also includes dichroic mirrors 40a, 40b. A dichroic mirror is located downstream of each of the collimators 38a,38b. A dichroic mirror is a mirror with different reflection and transmission properties at different wavelengths. The two collimated light pulses from the different cavities are combined using the dichroic mirrors 40a,40b. They are then focused into the sample 42. A shortpass filter 44 and then a spectrometer 46 are located downstream of the sample. The pump and Stokes light pulses from the sample are removed using the shortpass filter 44. A shortpass filter is a filter with a very sharp transition from transmission to reflection. The resulting CARS spectrum is measured at the spectrometer 46.

In an alternative laser device to that illustrated in FIG. 1, synchronised and mode-locked light pulses from each of the optical cavities 20a, 20b are not filtered within the respective optical cavity. More specifically, unfiltered, broadband light pulses such as those shown in FIG. 2 may be output from each of the optical cavities and subsequently filtered using optical filters placed externally to the optical cavity. For example, positioned between an optical outlet 26a, 26b and the inlet to the amplifier 36a, 36b to filter the generated light pulses prior to their amplification, or the optical filters may be connected to the outlet of their respective amplifiers to enable filtering of amplified light pulses. With the optical filter being removed from the optical cavity, these arrangements allow the construction of simpler and/or smaller optical cavities.

Figure 3:
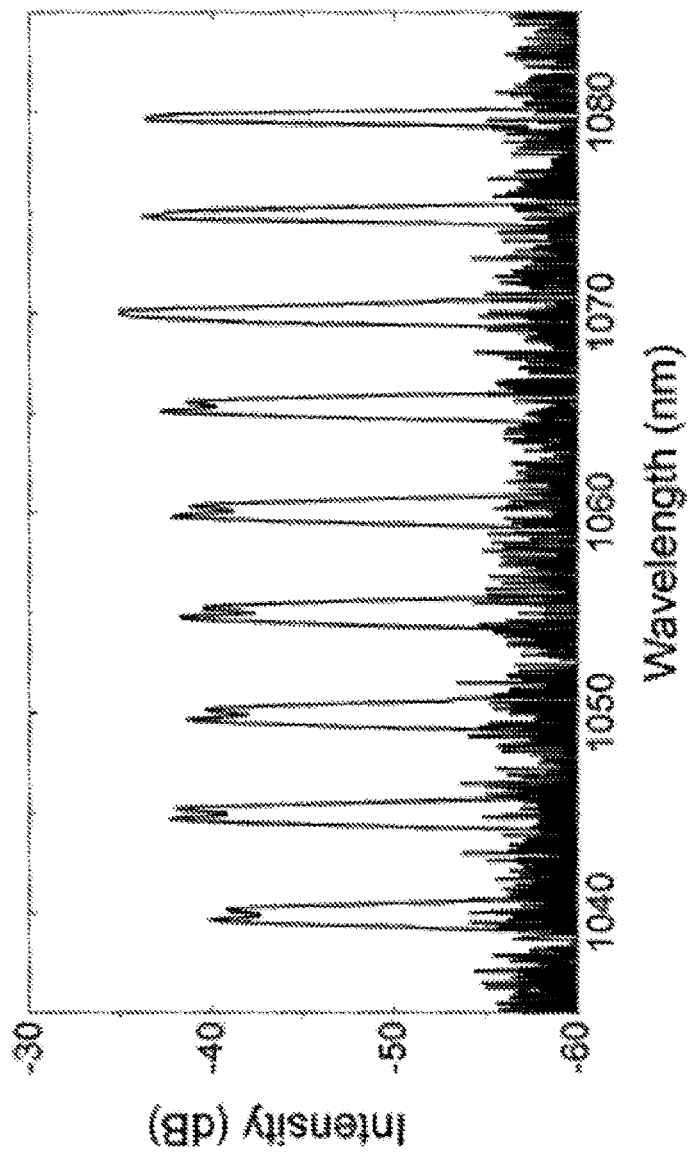
FIG. 3 is a graph showing the spectra of a synchronously locked Yb laser pulses output from the fiber laser setup of FIG. 1.
Figure 4:
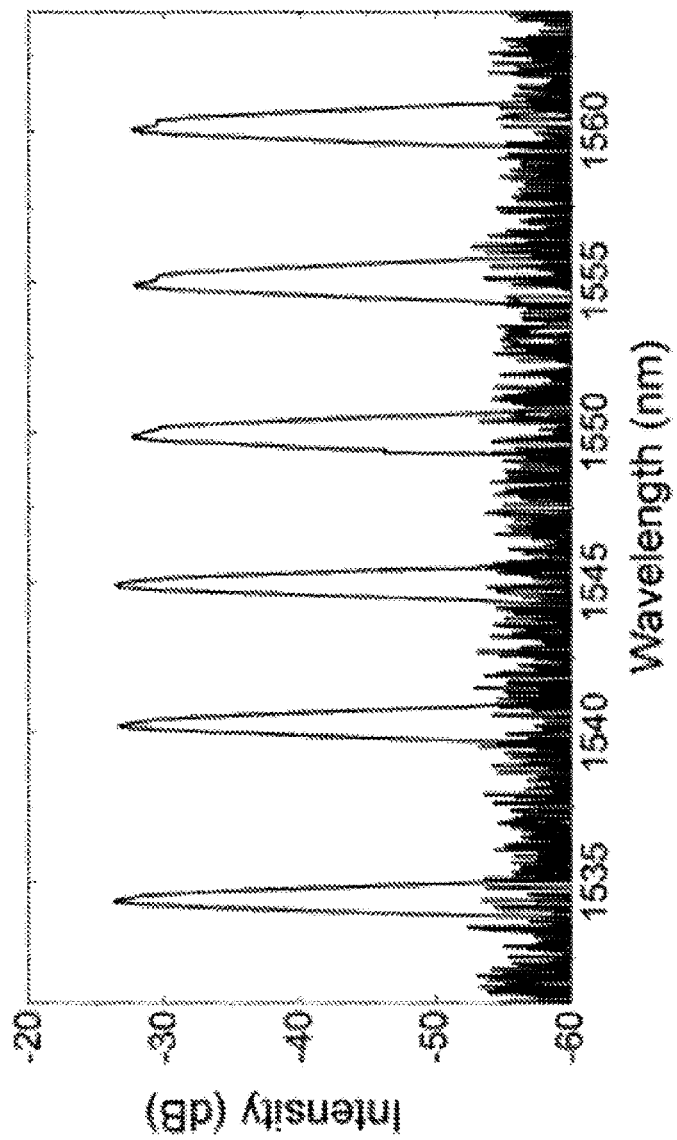
FIG. 4 is a graph showing the spectra of a synchronously locked Er laser pulses output from the fiber laser setup of FIG. 1.

In the example shown in FIG. 1, and as described above, the tunable optical filters 34a,34b are configured to tune the wavelengths of the Yb and Er light pulses to the range of 1040-1080 nm and 1535-1560 nm respectively, corresponding to approximately 2750-3200 $cm^{-1}$ frequency detuning. The measured spectra for the filtered Yb- and Er-light pulse, each in a synchronously locked state, are shown in FIGS. 3 and 4 respectively, where their respectively full width at half maximum (FWHM) spectral widths are approximately 1.2 nm and 2 nm over the tuning range. In comparison to the spectrum of the unfiltered Er-light pulse in FIG. 2, the spectrum of the filtered Er-light pulse in FIG. 4 focuses on the desirable wavelengths, thus improving the accuracy of CARS measurement. Furthermore, the temporal outputs of the two light pulses are measured with a background-free intensity autocorrelator. The deconvoluted FWHM pulse durations are approximately 5 picoseconds for both Yb- and Er-light pulses, measured at 1060 nm and 1550 nm respectively. This enables single-frequency CARS microscopy over the CH (Carbon to hydrogen bond) stretching band.

Figure 5:
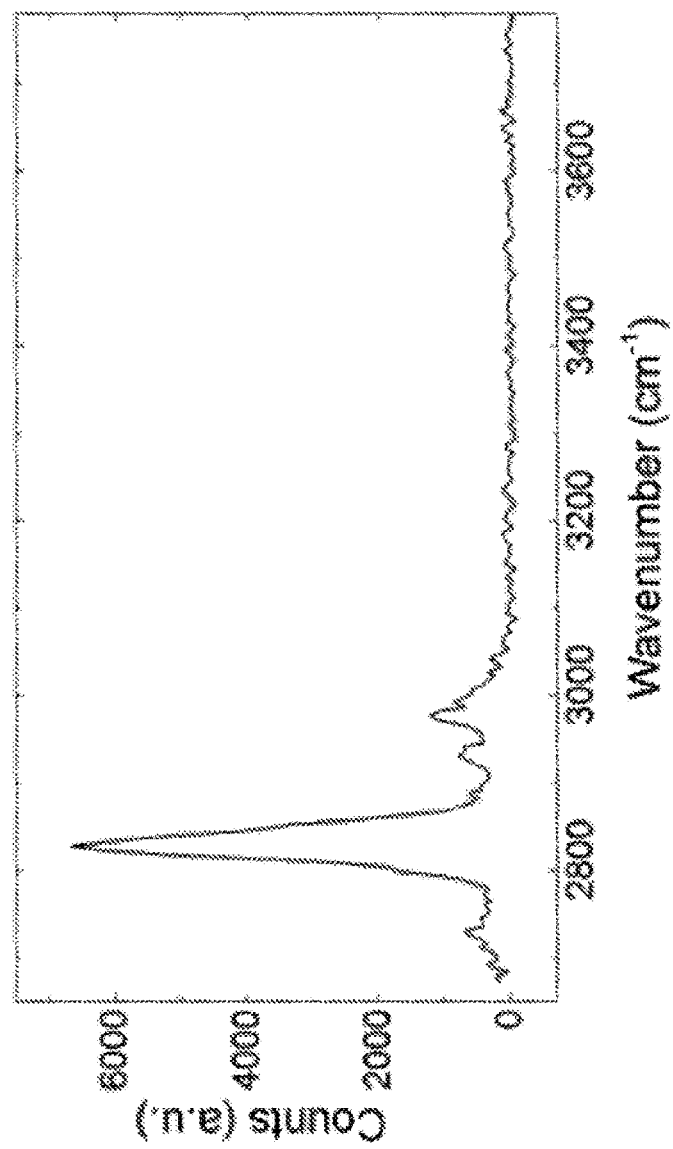
FIG. 5 is a graph showing the measured CARS spectrum of a methanol sample using the fiber laser setup as shown in FIG. 1.

FIG. 5 shows a measured CARS spectrum of a test methanol sample. A sharp resonant peak in emission is seen at −2840 $cm^{-1}$ detuning corresponding to the $CH_3$ stretching in methanol. The measurement illustrates that the laser device according to examples of the present invention is suitable for generating light pulses for coherent Raman spectroscopy that achieves an accurate CARS measurement.

Embodiments of the present invention have been described. It will be appreciated that variations and modifications may be made to the described embodiments within the scope of the present invention.

The invention claimed is:

1. A laser device for outputting filtered light pulses for inducing coherent Raman scattering in a sample, the laser device comprising:
   a first optical cavity comprising a first gain medium;
   a second optical cavity comprising a second gain medium different than the first gain medium,
      wherein the first gain medium and the second gain medium are each excitable by a pump light source to generate light at respective different ranges of wavelengths;
   a synchronizer optically coupled to both the first optical cavity and the second optical cavity, wherein the synchronizer is configured to synchronize and mode-lock light from the first optical cavity and the second optical cavity;
   a first optical filter and a second optical filter, wherein the first optical filter and the second optical filter are configured to:
      filter the light from the first optical cavity and the second optical cavity, respectively, in order to output first filtered pico-second light pulses at a first predetermined range of wavelengths and second filtered pico-second light pulses at a second predetermined range of wavelengths, and
      respectively output the filtered pico-second light pulses at a first optical outlet of the first optical cavity and at a second optical outlet of the second optical cavity,
      wherein at least one of the first optical outlet and the second optical outlet are, respectively, coupled to an optical isolator to directionally output the respectively output filtered pico-second light pulses;

a first fiber amplifier doped with the first gain medium at the first optical outlet and a second fiber amplifier doped with the second gain medium at the second optical outlet to amplify the light, wherein at least one of the first optical filter or second optical filter is a tunable optical filter and configured to vary the first predetermined range of wavelengths or the second predetermined range of wavelengths respectively, wherein the synchronizer comprises a saturable absorber and is configured to carry out synchronization and passive mode locking of the pico-second light pulses from the first optical cavity and the second optical cavity, wherein the laser device is integrated in an optical device that comprises:
two collimators configured to collimate the filtered pico-second light pulses, and
two dichroic mirrors configured to combine the collimated pico-second light pulses from both of the two collimators.

2. The laser device of claim 1, wherein the tunable optical filter comprises an etalon based fiber optic tunable filter.

3. The laser device of claim 1, wherein the first optical filter and the second optical filter are positioned within the first optical cavity and the second optical cavity respectively.

4. The laser device of claim 1, wherein the first optical filter and the second optical filter are positioned externally to the first optical cavity and the second optical cavity respectively.

5. The laser device of claim 1, wherein the synchronizer comprises graphene or carbon allotropes.

6. The laser device of claim 1, wherein the laser device is a fiber laser.

7. The laser device of claim 6, wherein the laser device is an all-fiber laser.

8. The laser device of claim 6, wherein each of the first optical cavity and second optical cavity comprises an isotropic optical fiber.

9. The laser device of claim 6, wherein each of the first optical cavity and second optical cavity comprises a single-mode optical fiber.

10. The laser device of claim 1, wherein one of the first optical cavity and second optical cavity comprises an optical delay line for matching the lengths of the first optical cavity and the second optical cavity.

11. The laser device of claim 10, wherein the optical delay line comprises a fiber-pigtailed optical delay line.

12. The laser device of claim 1, wherein the gain media comprise any one of ytterbium or erbium.

13. The laser device of claim 1, wherein the first predetermined range of wavelengths and the second predetermined range of wavelengths comprise the range of 1040 nm to 1080 nm and/or 1535 nm to 1600 nm.

14. A method of outputting filtered light pulses from a laser device for inducing coherent Raman scattering in a sample, the method comprising:

generating light at respective different ranges of wavelengths with a first optical cavity comprising a first gain medium and a second optical cavity comprising a second gain medium different to the first gain medium, wherein the first gain medium and the second gain medium are each excitable by a pump light source;

synchronizing and mode-locking, with a synchronizer optically coupled to both the first optical cavity and the second optical cavity, the light from the first optical cavity and the second optical cavity;

filtering, with a first optical filter and a second optical filter, the light from the first optical cavity and the second optical cavity respectively;

outputting from the first optical filter first filtered pico-second light pulses at a first predetermined range of wavelengths;

outputting from the second optical filter second filtered pico-second light pulses at a second predetermined range of wavelengths;

amplifying, at a first fiber amplifier doped with the first gain medium, the first optical filter outputted pico-second light pulses;

amplifying, at a second fiber amplifier doped with the second gain medium, the second optical filter outputted pico-second light pulses;

carrying out synchronization and passive mode locking of the light from the first optical cavity and the second optical cavity, using the synchronizer, wherein the synchronizer comprises a saturable absorber;

wherein at least one of the first optical filter or second optical filter is a tunable optical filter, wherein at least one of the first optical outlet and the second optical outlet are, respectively, coupled to an optical isolator to directionally output the respectively output filtered pico-second light pulses, and wherein the step of filtering comprises tuning the tunable filter to vary the first predetermined range of wavelengths or the second predetermined range of wavelengths;

collimating the filtered pico-second light pulses; and combining, using two dichroic mirrors, the collimated pico-second light pulses.

15. A laser device for outputting filtered pico-second light pulses for inducing coherent Raman scattering in a sample, the laser device comprising:

a first optical cavity comprising a first gain medium; and a second optical cavity comprising a second gain medium different than the first gain medium,
wherein the first gain medium and the second gain medium are each excitable by a pump light source to generate light at respective different ranges of wavelengths;

a synchronizer optically coupled to both the first optical cavity and the second optical cavity, wherein the synchronizer is configured to synchronize and mode-lock light from the first optical cavity and the second optical cavity; and a first optical filter and a second optical filter, wherein the first optical filter and the second optical filter are configured to:

filter the light from the first optical cavity and the second optical cavity, respectively, in order to output first filtered pico-second light pulses at a first predetermined range of wavelengths and second filtered pico-second light pulses at a second predetermined range of wavelengths, and respectively output the filtered pico-second light pulse at a first optical outlet of the first optical cavity and at a second optical outlet of the second optical cavity,
wherein the first optical filter and the second optical filter are positioned externally to the first optical cavity and second optical cavity, respectively; and a first fiber amplifier doped with the first gain medium at the first optical outlet and a second fiber amplifier doped with the second gain medium at the second optical outlet to amplify the light, wherein the synchronizer comprises a saturable absorber and is configured to carry out synchronization and passive mode locking of the pico-second light pulses from the first optical cavity and the second optical cavity, wherein the laser device is integrated in an optical device that comprises:
two collimators configured to collimate the filtered pico-second light pulses, and
two dichroic mirrors configured to combine the collimated pico-second light pulses from both of the two collimators.

* * * * *